United States Patent

Pilling

(10) Patent No.: US 8,541,041 B2
(45) Date of Patent: Sep. 24, 2013

(54) USE OF ALTERNAN AS A THICKENING AGENT AND THICKENING AGENT COMPOSITIONS CONTAINING ALTERNAN AND ANOTHER THICKENING AGENT

(75) Inventor: Jens Pilling, Dortmund (DE)

(73) Assignee: Bayer CropScience AG, Monheim (DE)

( * ) Notice: Subject to any disclaimer, the term of this patent is extended or adjusted under 35 U.S.C. 154(b) by 49 days.

(21) Appl. No.: 12/921,022

(22) PCT Filed: Mar. 6, 2009

(86) PCT No.: PCT/EP2009/001761
§ 371 (c)(1),
(2), (4) Date: Sep. 3, 2010

(87) PCT Pub. No.: WO2009/109408
PCT Pub. Date: Sep. 11, 2009

(65) Prior Publication Data
US 2011/0014345 A1    Jan. 20, 2011

Related U.S. Application Data

(60) Provisional application No. 61/068,897, filed on Mar. 11, 2008.

(30) Foreign Application Priority Data

Mar. 7, 2008    (EP) .................................. 08102413

(51) Int. Cl.
*A23L 1/054*    (2006.01)

(52) U.S. Cl.
USPC ........... 426/578; 426/573; 426/589; 426/590; 426/658

(58) Field of Classification Search
USPC .................. 426/573, 578, 589, 590, 580, 658
See application file for complete search history.

(56) References Cited

U.S. PATENT DOCUMENTS

| | | | |
|---|---|---|---|
| 4,540,510 A | | 9/1985 | Karl |
| 5,702,942 A | * | 12/1997 | Leathers et al. ........... 435/252.9 |
| 5,786,196 A | | 7/1998 | Cote et al. |
| 2006/0093720 A1 | | 5/2006 | Tatz |
| 2006/0127328 A1 | | 6/2006 | Monsan et al. |
| 2006/0141127 A1 | | 6/2006 | Stephan et al. |

FOREIGN PATENT DOCUMENTS

| | | |
|---|---|---|
| WO | WO 00/47727 | 8/2000 |
| WO | WO 03/008618 | 1/2003 |
| WO | WO 2008/098975 | 8/2008 |

OTHER PUBLICATIONS

Cote, Carbohydrate Polymers, vol. 19, pp. 249-252 (1992).
Cote et al., Carbohydrate Research, vol. 101, pp. 57-74 (1982).
Jeanes et al., Journal of American Chemical Society, vol. 76, pp. 5041-5052 (1954).
Lopez-Munguia et al., Enzyme Microbial Technology—Elsevier, vol. 15, pp. 77-85 (1993).
Misaki, Carbohydrate Research, vol. 84, pp. 273-285 (1980).
Seymour, Carbohydrate Research, vol. 74, pp. 41-62 (1979).

(Continued)

*Primary Examiner* — Helen F Heggestad
(74) *Attorney, Agent, or Firm* — Hunton & Williams LLP

(57) ABSTRACT

The invention relates to the use of alteman as a thickening agent, in particular for foodstuffs, a thickening agent composition comprising alternan and at least one thickening agent, a foodstuff comprising the thickening agent composition, and a method of increasing the viscosity of foodstuffs.

21 Claims, 2 Drawing Sheets

(56) References Cited

OTHER PUBLICATIONS

Anonymous, "IFIS Dictionary of Food Science and Technology," International Food Service XP002490903, Nov. 16, 2007.
Hazen, "Stabilizer Solutions," Food Product Design, XP002492223, May 5, 2006, Retrieved from the Internet: http://www.foodproductdesign.com/articles/463/463_651concepts.html.
Kuntz, "Special Effects with Gums," Food Product Design, XP002492224, Dec. 1999, Retrieved from the Internet: http://www.foodproductdesign.com/articles/463/463_1299ap.html.
International Search Report for International Patent Application No. PCT/EP2009/001761 mailed May 6, 2009.
International Preliminary Report on Patentability for International Application No. PCT/EP2009/001761 issued on Sep. 7, 2010.
Cindy Hazen: "Stabilizer Solutions" Food Product Design, [Online] May 5, 2006, XP002492223 Retrieved from the Internet: URL:http://www.foodproductdesign.com/articles/463/463_651concepts.html.
Lynn A. Kuntz: "Special Effects With Gums" Food Product Design, [Online] Dec. 1, 1999, XP002492224 Retrieved from the Internet: URL:http://www.foodproductdesign.com/articles/463/463_1299ap.html.

* cited by examiner

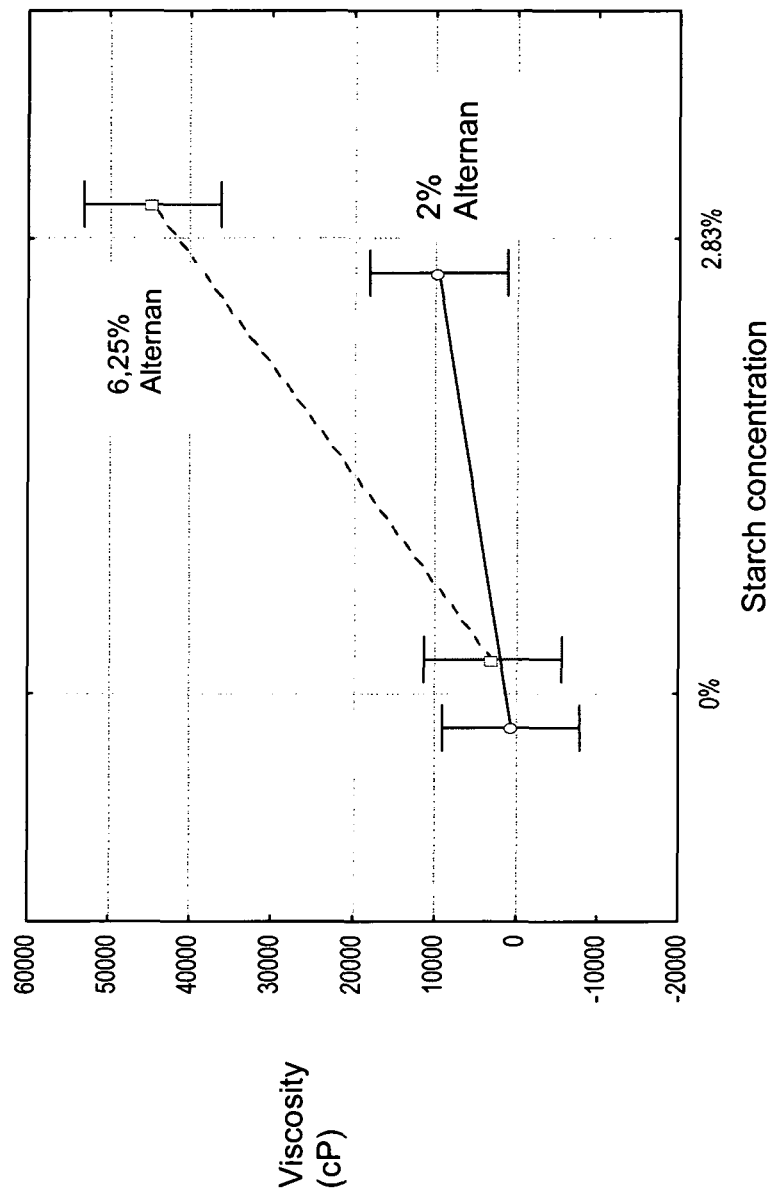

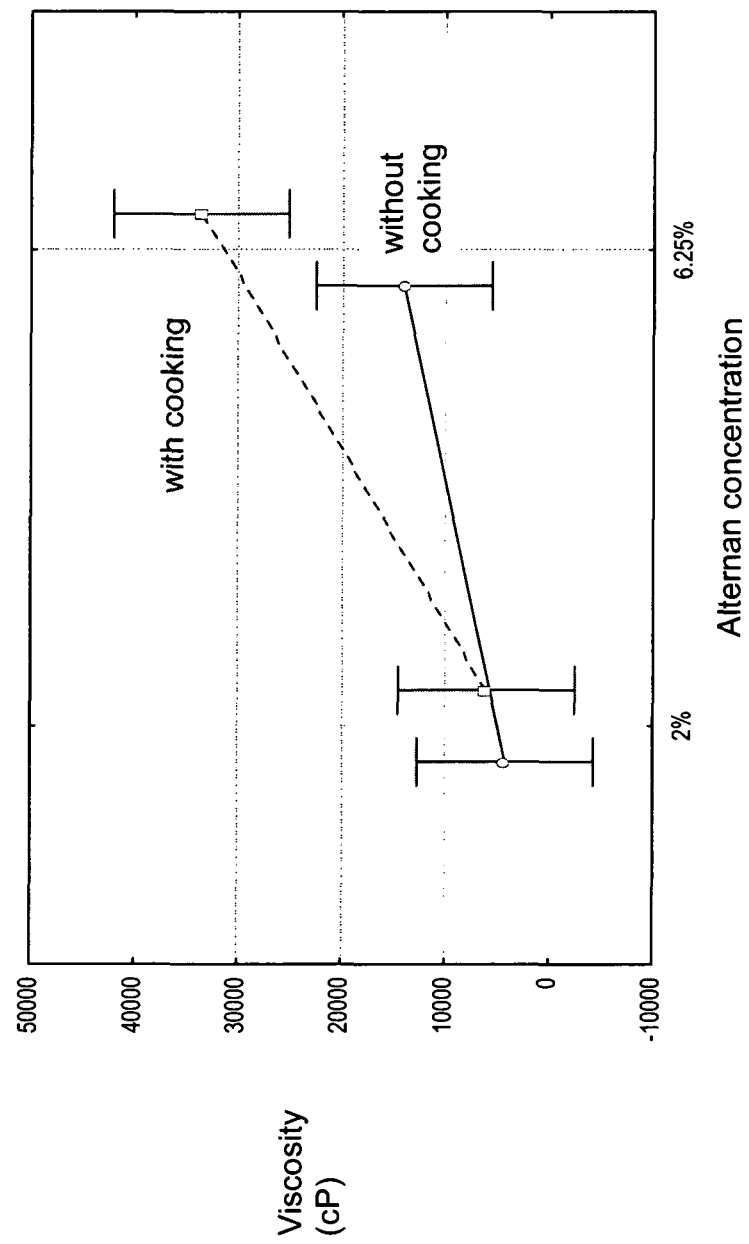

USE OF ALTERNAN AS A THICKENING AGENT AND THICKENING AGENT COMPOSITIONS CONTAINING ALTERNAN AND ANOTHER THICKENING AGENT

CROSS-REFERENCE TO RELATED APPLICATIONS

This application is the U.S. National Stage filing of International Patent Application No. PCT/EP2009/001761, filed Mar. 6, 2009, which claims priority to EP 08102413.5, filed Mar. 7, 2008, and U.S. Provisional Application No. 61/068, 897, filed Mar. 11, 2008, the disclosures of each of which are hereby incorporated by reference in their entirety.

FIELD OF THE INVENTION

The present invention relates to the use of alternan as a thickening agent, in for foodstuffs, a thickening agent composition comprising alternan and at least one other thickening agent, a foodstuff comprising the thickening agent composition, and a method of increasing the viscosity of foodstuffs.

BACKGROUND OF THE INVENTION

Usual thickening agents for foodstuffs, which have been known for a long time, are starch, starch derivatives, modified starch, pectins, alginic acid, alginates, guar flour, tragacanth, gum arabic, gelatin, carob-seed flour, galactomannan, xanthan, carrageen, karaya gum, tara gum, tamarind gum, gellan gum, mannan, maltodextrin etc. There is extensive literature on this subject, see for example Belitz, Grosch, Handbuch der Lebensmittelchemie [Manual of food chemistry], 4th edition, 1992, Springer Verlag, Berlin-Heidelberg-New York; R. L. Whistler, J. N. BeMiller, Carbohydrate Chemistry for Food Scientists, 1997, Eagan Press, St. Paul, USA; A. Nussinovitch, Hydrocolloid Applications, 1997, Blackie Academic & Professional, London.

Synergistic thickening agent compositions for printing inks and cosmetic formulations etc. are described in U.S. Pat. No. 4,540,510. U.S. Pat. No. 4,540,510 describes a composition comprising a polymer of an acrylamide-methylpropanesulfonic acid with a molecular weight above about a million and a water soluble polymer, which is selected from galactomannan gum, hydroxyalkyl ethers of galactomannan gum, hydroxyalkylcellulose ethers, polyalkylene oxide polymers and mixtures thereof, the polymers being present in the mixture in proportions such that a synergistic thickening effect is achieved in liquids.

Patent application US20060141127 describes a thickening system for beverages, especially for juices. The thickening system is made up of two components, a thickener and a thickening auxiliary, which display a synergistic effect. The synergistic effect makes it possible to reduce the amount of thickening agent used. The thickener is selected from flours, gums, modified food starches and mixtures thereof, and the auxiliary is selected from citrus flavoring, citrus oil, lemon peel and mixtures thereof.

DETAILED DESCRIPTION OF PREFERRED EMBODIMENTS OF THE INVENTION

The aim of the present invention was to find another effective thickening agent or a highly effective thickening agent composition, which is suitable in particular for use in foodstuffs. This aim is achieved with the technical teaching according to the appended patent claims.

The present invention relates to the use of alternan as a thickening agent.

Alternan is, according to the present invention, a polysaccharide that is made up of glucose units. The glucose units are linked together via $\alpha$-1,3- and $\alpha$-1,6-glycosidic bonds and these two bond types mainly occur alternately. Alternan may contain branchings (Seymour et al., Carbohydrate Research 74, (1979), 41-62). Alternan and methods of production of alternan are known from the prior art and are described e.g. in Jeanes et al. (1954) J. Am. Chem. Soc., 76: 5041-5052, Misaki et al. (1980) Carbohydr. Res., 84: 273-285, Cote and Robyt (1982), Carbohydr. Res., 101: 57-74, Cote (1992), Carbohydrate Polymers 19, 249-252, WO 00/47727, U.S. Pat. No. 5,702,942, US20060127328, PCT/EP2008/051760.

The alternan used in the present invention preferably possesses a weight-average molecular weight Mw in the range from about 10 000 000 g/mol to about 60 000 000 g/mol (determined with GPC MALLS), even more preferably about 12 000 000 g/mol to about 50 000 000 g/mol.

In one embodiment the alternan used is produced with the aid of alternan sucrase from Leuconostoc mesenteroides, as described in patent application WO 00/47727, and preferably has a weight-average molecular weight Mw in the range from about 33 000 000 g/mol to about 60 000 000 g/mol (determined with GPC MALLS), even more preferably about 33 000 000 g/mol to about 50 000 000 g/mol.

In another preferred embodiment an alternan is used that has a weight-average molecular weight Mw in the range from 12 000 000 to 30 000 000 g/mol (determined with GPC MALLS), more preferably 14 000 000 to 28 000 000 g/mol, even more preferably 16 000 000 to 26 000 000 g/mol, most preferably 19 000 000 to 23 000 000 g/mol and is produced with the aid of a shortened alternan sucrase. The shortened alternan sucrases, the production method for said alternan and the alternan are described in international application PCT/EP2008/051760, which is expressly referred to here.

The term thickening agent according to this invention means a high-molecular substance that absorbs liquids, preferably water, swells, and finally is converted to a viscous true or colloidal solution.

Alternan can be used according to the invention as thickening agent to increase the viscosity of liquids or to improve the thixotropic properties of gels.

Alternan is preferably used for the thickening of industrial, cosmetic, pharmaceutical or dietetic preparations, e.g. of paints, creams, cleaning agents, textile finishing, inks, coating dispersions, adhesives, paper, (dietetic) foodstuffs, foodstuff intermediates and foodstuff starting products. The term foodstuffs according to the present invention also includes beverages.

Use for the thickening of (dietetic) foodstuffs is quite especially preferred, as alternan is edible but is noncaloric. Foodstuffs may without limitation be selected from sauces, meat juices, soups, dressings, dips, milk products, such as yoghurt, drinking yoghurt, cream, full-fat milk, skimmed milk, buttermilk, sour milk, kefir, whey, mousse, jelly, pudding, spreads, jam, ice cream, bakery products and doughs.

Alternan can be mixed with a (dietetic) foodstuff during production of the foodstuff or directly before consumption of the foodstuff. The alternan is preferably in the form of a powder or a paste, e.g. mixed with water.

Alternan is added to a foodstuff in an amount that provides the desired degree of thickening. Usual amounts are 0.1-10 wt % based on the total weight of the foodstuff, 0.1-5 wt. %, 0.1-4 wt. %, or 0.1-3 wt. %.

In another aspect the invention relates to a thickening agent composition comprising alternan and at least one other thickening agent. It was established that said compositions have a synergistic thickening effect. The term "thickening agent" has the meaning already stated previously.

In a preferred embodiment the other thickening agent, which together with alternan forms the thickening agent composition, is a polysaccharide. Preferred thickening agents are selected from the group consisting of starch, starch derivatives, modified starches, starch phosphates, pectins, modified pectins, alginic acid, alginates, guar flour, tragacanth, gum arabic, gelatin, carob-seed flour, galactomannan, xanthan, carrageen, karaya gum, tara gum, tamarind gum, gellan gum, mannan, maltodextrins, cellulose, derivatized cellulose, dextran and mixtures of two or more of these substances. The stated substances belong to the prior art and are described in more detail in the technical literature and dictionaries, such as Römpp Lexikon Chemie, 10th edition, 1997, Thieme Verlag, Stuttgart; Belitz, Grosch, Handbuch der Lebensmittelchemie, 4th edition, 1992, Springer Verlag, Berlin-Heidelberg-New York; R. L. Whistler, J. N. BeMiller, Carbohydrate Chemistry for Food Scientists, 1997, Eagan Press, St. Paul, USA; A. Nussinovitch, Hydrocolloid Applications, 1997, Blackie Academic & Professional, London.

A quite especially good synergistic thickening effect is achieved with a thickening agent composition comprising alternan and a thickening agent which is selected from starch, modified starches, starch derivatives, and starch phosphates. Mixtures comprising alternan and two or more thickening agents selected from starch, modified starches, starch derivatives, and starch phosphates can also be used. In a special embodiment, the above mentioned compositions consist only of alternan and one or more thickening agents selected from starch, modified starches, starch derivatives and starch phosphates.

The polysaccharide starch is a polymer of chemically homogeneous basic structural units, the glucose molecules. Starch is a mixture of different molecular forms, which differ with respect to their degree of polymerization, the occurrence of branchings of the glucose chains and their chain lengths, and which can moreover be modified, e.g. phosphorylated. Main constituents of starch are amylase and amylopectin. Amylose is an essentially unbranched polymer of alpha-1,4-glycosidically linked glucose molecules. Amylopectin is a complex mixture of differently branched glucose chains: glucose units are linked in a linear way with $\alpha(1\rightarrow4)$ bonds and the branchings come about here as a result of the occurrence of additional alpha-1,6-glycosidic linkages. In typical plants used for industrial starch production or as foods, such as, for example, corn, rice, wheat or potatoes, the synthesized starch consists to about 20% - 25% of amylose and to about 70% - 75% of amylopectin. Basic information about starch and processes for production of starch can for example be found in the following literature: Römpp Dictionary of Chemistry, J. Falbe and M. Regitz (Editors), 10. Ed., Thieme, Stuttgart, New York (1999); Tegge, G., Hrsg., Stärke and Stärkederivate, 3. Ed.; Behr's: Hamburg, (2004); Galliard, T., Starch: Properties and Potential, Wiley: New York, (1987); Zoebelein, H., Hrsg., Dictionary of Renewable Resources, 2. Ed., Wiley-VCH: Weinheim, (1997); Klingler, R. W., Grundlagen der Getreidetechnologie, Behr's: Hamburg, (1995); p. 128; Loncin, Marcel Grundlagen der Verfahrenstechnik in der Lebensmittelindustrie [Basics of method engineering in the food industry]. Frankfurt/Main: Verlag Sauerländer 1969; Tscheuschner, H.D. Grundzüge der Lebensmitteltechnik [Basics of food technology]. Hamburg: Behrs Verlag 2004; Kessler, H.G. Lebensmittel-und Bioverfahrenstechnik [Food and bioprocess technology]. Munich: Verlag A. Kessler 1996; Martin, A.M. Bioconversion of waste materials to industrial products. London, New York: Blackie Academic & Professional 1998.

Starch can be obtained by known methods (see e.g. above-mentioned literature) from the usual sources, such as from potatoes, maranta (arrowroot), cassava (tapioca), sweet potato, wheat, maize (corn), rye, rice, barley, millet, oats, sorghum, chestnuts, acorns, peas, beans, bananas. Cold-swelling starch has proved to be very advantageous. Thus the starch which is used in the composition of the present invention can be starch from potatoes, maranta (arrowroot), cassava (tapioca), sweet potato, wheat, maize (corn), rye, rice, barley, millet, oats, sorghum, chestnuts, acorns, peas, beans, or bananas. In special embodiments the starch which is used in the in the composition of the present invention can be a waxy starch. Waxy starch according to the present invention is a starch containing less than 10%, preferably less than 5%, more preferably less than 3%, even more preferably less than 2% and most preferably less than 1% amylose. Waxy starches from potato, rice and maize (corn) are particularly suitable, without being limited to these.

In conjunction with the present invention, the term "modified starch" is to be understood to mean a starch, the characteristics of which have been changed after isolation from vegetable cells with the help of chemical, enzymatic, thermal and/or mechanical methods. Starches may be modified to, inter alia, increase their stability against excessive heat, acid, and freezing; to change their texture; or to lengthen or shorten gelatinization time. In one embodiment of the present invention, the modified starch is starch that has been heat-treated and/or acid-treated. In a further embodiment, the modified starch is a cross-linked starch. In still another embodiment, the modified starch is a starch graft polymer. In still other embodiments, the modified starch is an oxidised starch, alkaline-modified starch, bleached starch, enzyme-treated starch, acetylated starch, acetylated oxidized starch, or pre-gelatinized starch. In a further embodiment, the modified starch is a starch ester, in particular a starch ester, wherein the ester groups having been introduced into the starch by using organic acids. Particularly preferably these are phosphate, nitrate, sulphate, xanthate, acetate or citrate starches. Particular examples of modified starches are dextrins (such as No. E 1400), acid-treated starches (such as No. E 1401), alkaline-modified starches (such as No. E 1402), bleached starches (such as No. E 1403), oxidised starches (such as No. E 1404), enzyme-treated starches (such as No. E 1405), mono starch phosphates (such as No. E 1410), di starch phosphates (such as No. E 1412), phosphated di starch phosphates (such as No. E 1413), acetylated di starch phosphates (such as No. E 1414), acetylated starches (such as No. E 1420), acetylated starches (such as No. E 1421), acetylated di starch adipates (such as No. E 1422), acetylated di starch glycerols (such as No. E 1423), di starch glycerols (such as No. E 1430), hydroxypropyl starches (such as No. E 1440), hydroxypropyl di starch glycerols (such as No. E 1441), hydroxypropyl di starch phosphates (such as No. E 1442), starch sodium octenyl succinates (emulsifying starches, such as No. E 1450), acetylated oxidized starches (such as No. E 1451).

Methods for manufacturing modified starches are known to the person skilled in the art and are adequately described in the general literature. An overview on the manufacture of modified and derived starches can be found, for example, in Orthoefer (in Corn, Chemistry and Technology, 1987, eds. Watson and Ramstad, Chapter 16, 479-499); Modified Starch, Ridgwell Press, 2002

In conjunction with the present invention, the term "starch derivative" is to be understood to mean starches whose amylase/amylopectin ratio is altered, which are partially hydrolyzed or which are chemically modified. Chemical modification can be for example be done by reacting starch with mono-, bi- or polyfunctional reagents or oxidizing agents. Such reactions mainly base on conversion of hydroxyl groups of the polyglucans by etherification (e.g. hydroxyalkylstarches), esterification, oxidation and/or graft-copolymerization. Starch derivatives are further defined in described in the following literature, which is incorporated by reference: Römpp Dictionary of Chemistry, Keyword "starch derivatives", J. Falbe and M. Regitz (Editors), 10. Ed., Thieme, Stuttgart, New York (1999); Houben-Weyl 14/2, 900; Schriftenr. Fonds Chem. Ind. 1986, H. 25, 5. The terms "starch derivative" and "modified starch" may, in some cases, encompass identical substances. However, both terms are common terms in standard literature. Starch phosphates and methods of production thereof are known from the prior art (for example: Römpp Dictionary of Chemistry, J. Falbe and M. Regitz (Editors), 10. Ed., Thieme, Stuttgart, New York (1999); Nakano, T.; Salvador, A. S.; Tamochi, J.; Sugimoto, Y.; Ibrahim, H. R.; Toba, Y.; Aoe, S.; Kawakami, H.; Aoki, T., Nahrung/Food, (2003) 47(4), 274-278; Marques, A. P.; Reis, R. L.; Hunt, J. A., Biomaterials, (2002) 23, 1471-1478; Whistler u. BeMiller (Hrsg.), Industrial Gums (3.), S. 592, San Diego: Academic Press 1993). Particular examples of starches phosphates are mono starch phosphates (such as No. E 1410), di starch phosphates (such as No. E 1412), phosphated starch phosphates (such as No. E 1413), acetylated di starch phosphate (such as No. E 1414) and hydroxypropyl di starch phosphate (such as No. E 1442).

Starch phosphate can be a starch phosphate in the form of a monoester in the C2, C3 or C6 position of the polymerized glucose monomers (Takeda and Hizukuri, 1971, Starch/Stärke 23, 267-272). The phosphate distribution of the phosphate in starch synthesized by plants is distinguished in general in that approximately 30% to 40% of the phosphate radicals in the C3 position and approximately 60% to 70% of the phosphate radicals in the C6 position of the glucose molecules are covalently bonded (Blennow et al., 2000, Int. J. of Biological Macromolecules 27, 211-218). Blennow et al. (2000, Carbohydrate Polymers 41, 163-174) determined a content of starch phosphate which is bonded in the C6 position of the glucose molecules for various starches, such as, for example, potato starch (between 7.8 and 33.5 nmol per mg of starch, depending on cultivar), starch from various Curcuma species (between 1.8 and 63 nmol per mg, depending on cultivar), tapioca starch (2.5 nmol per mg of starch), rice starch (1.0 nmol per mg of starch), mung bean starch (3.5 nmol per mg of starch) and sorghum starch (0.9 nmol per mg of starch).

The starch which is used in the composition of the present invention can in another embodiment be a resistant starch, particularly one of the known resistant starch types 1 to 4.

A quite especially good synergistic thickening effect is also achieved with a thickening agent composition comprising alternan and cellulose, such as microcrystalline cellulose, or derivatized cellulose. Examples of derivatized cellulose are, without limitation, cellulose ethers, celluloseacetate, cellulosepropionate, cellulosebutyrate, cellulosenitrate, cellulosexanthogenate, cellulosecarbamate and cellulose esters.

In one embodiment cellulose derivatives are cellulose ethers, especially alkylethers and aralkylethers, which can, without limitation, be selected from carboxymethylcellulose, sodiumcarboxymethylcellulose, crosslinked sodiumcarboxymethylcellulose, (enzymatically) hydrolyzed carboxymethylcellulose, carboxymethylhydroxyethylcellulose, methylcellulose, ethylcellulose, ethylmethylcellulose, propylcellulose, benzylcellulose, hydroxymethylcellulose, hydroxyethyl cellulose, hydroxypropylcellulose, methylhydroxyethylcellulose, methylhydroxypropylcellulose, methylhydroxybutylcellulose ethylhydroxyethylcellulose, hydroxypropylmethylcellulose, and Cyanoethylcellulose. See also: Whistler u. BeMiller (Hrsg.), Industrial Gums (3.), S. 475ff., San Diego: Academic Press 1993.

A quite especially good synergistic thickening effect is further achieved with alginates and carrageen.

Still other beneficial embodiments of the invention are mixtures comprising alternan and another thickening agent which is selected from starch, modified starches, starch phosphates, starch derivatives, cellulose, derivatized cellulose, alginate, carrageen, and a mixture of two or more of these substances.

In the thickening agent composition according to the invention the alternan and the other thickening agent are preferably in a weight ratio from 10:1 to 1:10, more preferably 8:1 to 1:8, even more preferably 5:1-1:5, especially preferably 2.5:1-1:2.5 and most preferably 1.5:1-1:1.5.

The thickening agent composition can be in a great variety of forms, for example as granules or powder, and a powder is the most preferred.

In another variant of the present invention the previously described components, alternan and another thickening agent, are prepared in the form of a kit. This means that the two components are present unmixed but are put together in a packing unit, for example in a packing unit with two separate containers, with the alternan contained in one container and the other thickening agent in the other container. By means of the kit, a thickening agent composition according to the invention can be prepared as required in the form of a mixture of the components and can then be used further. Both components of the kit are preferably in powder form.

The other thickening agent in the kit can be the same as already stated above for the compositions, though quite especially preferably starch, modified starch, starch phosphate, starch derivatives, or a mixture of two or more of these substances. The proportions by weight of the components of the kit are preferably selected as already described above for the thickening agent compositions.

In another aspect the present invention relates to the use of the previously described thickening agent composition or of the previously described kit for the thickening of foodstuffs, foodstuff starting products or foodstuff intermediates.

Use for the thickening of (dietetic) foodstuffs is one embodiment of the invention. Foodstuffs may without limitation be selected from sauces, meat juices, soups, dressings, dips, milk products, such as yoghurt, drinking yoghurt, cream, full-fat milk, skimmed milk, buttermilk, sour milk, kefir, whey, mousse, jelly, pudding, spreads, jam, ice cream, bakery products and doughs.

The previously described thickening agent composition or the previously described kit can be mixed in with (dietetic) foodstuffs during production of the foodstuff or directly before consumption of the foodstuff.

The composition is added to a foodstuff in an amount with which the desired degree of thickening is achieved. Usual amounts are 0.1-10 wt % based on the total weight of the foodstuff, 0.1-5 wt. %, 0.1-4 wt. %, or 0.1-3 wt. %.

In yet another aspect, the present invention relates to a foodstuff, foodstuff starting product or foodstuff intermediate that contains a thickening agent composition as described above. The content of thickening agent composition is preferably as stated above. The thickening agent composition can be mixed in with a foodstuff during production of the foodstuff or directly before consumption of the foodstuffs.

Foodstuffs according to the invention may without limitation be selected from sauces, meat juices, soups, dressings, dips, milk products, such as yoghurt, drinking yoghurt, cream, full-fat milk, skimmed milk, buttermilk, sour milk, kefir, whey, mousse, jelly, pudding, spreads, jam, ice cream, bakery products and doughs.

Finally the invention also relates to a method of increasing the viscosity of foodstuffs, foodstuff starting products or foodstuff intermediates, in which a thickening agent composition as described above is mixed in with the foodstuff, foodstuff starting product or foodstuff intermediate.

A particularly good thickening effect can be achieved if the foodstuff, foodstuff starting product or foodstuff intermediate undergoes a heat treatment after adding the thickening agent composition according to the invention. Heat treatment means heating the foodstuff, foodstuff starting product or foodstuff intermediate to 80-100° C., and the heating can take place during the production process or following the production process. The duration of heating is variable and depends on the particular foodstuff. Usually, however, heating takes place for at least 10 seconds.

The present invention is described below with examples, but these are not in any way to be regarded as limiting the scope of the invention.

EXAMPLES

1. Production of Alternan

Method 1

The plasmid pAI-B-A1Su Q29 was transformed in E. coli dH5α. pAI-B-A1Su contains the coding sequence of full-length alternan sucrase from Leuconostoc mesenteroides strain NRRL B-1355 (cf. WO 00/47727), without the N-terminal 39 amino acids of the signal peptide, linked to an octapeptide strep-tag at the C-terminal end. The strep-tag is linked via a dipeptide linker to the protein. Expression of the alternan sucrase is under the transcription control of the tetA promoter/operator and repressor. The tetA promoter is strongly regulated by the tet-repressor, which is encoded on the same plasmid and is expressed constitutively by the β-lactamase promoter. In this way expression of the alternan sucrase is stringently suppressed until efficient chemical induction by tetracycline or anhydrotetracycline, AHT, occurs.

The cells were precultivated in mineral medium (Horn et al., 1996) with 100 μg/ml ampicillin and 10% LB medium. Mineral medium, without LB, was inoculated with this preculture. The cells were grown at 37° C. and induced with anhydrotetracycline (AHT) (0.2 mg/L), and grown further at 25° C. The cells were harvested, resuspended in [10 mM MOPS pH 7.6; 2.5 mM CaCl2 and 0.05% Triton X-100] and extracted using a high-pressure homogenizer. The cell lysate was centrifuged for 20 minutes at 4° C. and 20000 rev/min. The supernatant was filtered on a 0.22 μm filter and an alternan sucrase extract was obtained.

Alternan was produced in a 60-liter biotransformation, which contained 0.13% acetic acid, 100 mM NaAc pH 5.3, 20% sucrose, 1 mM DTT and 1600 ml filtered alternan sucrase extract (approx. 3900 units). The reaction mixture was incubated for 60 hours at 37° C. The alternan obtained was precipitated with 60 liters of technical ethanol for 40 h at 4° C., then washed twice with 60 liters of technical ethanol and once with 60 liters of 60% absolute ethanol. The product was dried by lyophilization. The weight-average molecular weight of the alternan was approx. 37 000 000 g/mol.

Method 2 (for Example 3)

The plasmid pAI-B-A1Su Q29 (for description see above) was transformed in E. coli dH5α. The cells were precultivated in mineral medium (Horn et al., 1996) with 100 μg/ml ampicillin and 10% LB medium. Mineral medium, without LB, was inoculated with this preculture. The cells were grown at 37° C. and at an optical density ($OD_{600}$) of 50 they were induced with anhydrotetracycline (AHT) (0.2 mg/L), and grown for a further 22 h up to an $OD_{600}$ of 140 at 25° C. The cells were harvested by centrifugation, resuspended in 100 mM NaAc, pH 5.3 and disrupted with a high-pressure homogenizer (2 cycles, 1200 bar). The cell lysate was treated with DNase/RNase (3 mg/l). The resultant extract was centrifuged in order to obtain the undissolved cellular constituents including the inclusion bodies. The supernatant was discarded, the pellet was resuspended in 8 M urea, 50 mM NaAc pH 5.3 and incubated for an hour on ice, with shaking. Undissolved cellular constituents were removed by centrifugation. For renaturation the supernatant was diluted 1:18.75 times in 0.5 M urea, 2.5 mM CaCl2, 100 mM NaAc pH 5.3. The renatured inclusion bodies were frozen immediately in liquid nitrogen and stored at −20° C.

The activity was determined in an activity assay (Lopez-Mungia et al., 1993). One unit of alternan sucrase corresponds to the conversion of 1 μmol fructose per minute at 37° C.

Alternan was produced in a 30-liter biotransformation, which contained 75 mM NaAc pH 5.3, 20% sucrose and 5000 ml renatured inclusion bodies (approx. 11950 units). The reaction mixture was incubated for 47 hours at 37° C. The alternan obtained was precipitated with 30 liters of technical ethanol for 40 h at 4° C., then washed twice with 30 l technical ethanol and once with 30 liters of 60% absolute ethanol. The product was dried by lyophilization. The weight-average molecular weight of the alternan was approx. 40 000 000 g/mol.

Reference:

Horn U, Strittmatter W, Krebber A, Knupfer U, Kujau M, Wenderoth R, Muller K, Matzku S, Pluckthun A, Riesenberg D. High volumetric yields of functionally dimeric miniantibodies in Escherichia coli, using an optimized expression vector and high-cell-density fermentation under nonlimited growth condition. Appl Microbiol Biotechnol 1996; (46): 524-532.

2. Thickening of Sauce

A simple sauce system was selected for testing the viscosity-forming properties of alternan.

| Basic recipe | |
|---|---|
| Chicken broth | 89.85% |
| Starch | 2.83% |
| Soybean oil | 3.63% |
| Flour | 2.12% |
| Chicken bouillon | 1.21% |
| Xanthan | 0.25% |
| Salt | 0.10% |

Alternan, produced as in Example 1, and/or starch (Resista®, a modified waxy-maize starch from Tate & Lyle company) were used as thickeners.

Cooking: defined as heating the recipe with alternan to a temperature of 85-87° C. and holding at this temperature for 10 minutes. If no cooking step with alternan was carried out, the alternan was stirred into the sauce after the 10-minute holding time.

Viscosity measurement: measured with a Brookfield RV viscometer. The speed was set to a constant 20 rev/min. The spindles were changed depending on the thickening of the sample. The sauce was brought to room temperature (21° C.). The viscosities were in the range from 20 cP to 80000 cP (cP=centipoise).

Method:
a) Method without cooking
1. Measure the chicken broth
2. Premix the flour with starch, if present
3. Add the dry mixture to cold chicken broth, whisking vigorously
4. Determine the cold viscosity (scale from 1 to 10, where 1 denotes low viscosity and 10 denotes very high viscosity)
5. Add the chicken bouillon and salt
6. Add the oil
7. Heat the mixture to a temperature of 85-88° C.
8. Determine the hot viscosity (scale from 1 to 10, where 1 denotes low viscosity and 10 denotes very high viscosity)
9. Cover the pan and maintain the temperature for 10 min
10. Remove the cover and whisk the sauce while it slowly cools. The sauce is still hot (65-71° C.)
11. Add the alternan in stages until thoroughly mixed
12. Determine the viscosity after adding the alternan (scale from 1 to 10, where 1 denotes low viscosity and 10 denotes very high viscosity)
13. Put the finished sauce in a preserving jar and seal b) Method with cooking
1. Measure the chicken broth
2. Premix the flour and alternan and, if present, starch,
3. Add the dry mixture to cold chicken broth, whisking vigorously
4. Determine the cold viscosity (scale from 1 to 10, where 1 denotes low viscosity and 10 denotes very high viscosity)
5. Add the chicken bouillon and salt
6. Add the oil
7. Heat the mixture to a temperature of 85-88° C.
8. Determine the hot viscosity (scale from 1 to 10, where 1 denotes low viscosity and 10 denotes very high viscosity)
9. Cover the pan and maintain the temperature for 10 min
10. Remove the cover and whisk the sauce while it slowly cools
11. Put the finished sauce in a preserving jar and seal Results:

Starch and alternan have a significant effect on viscosity. At high concentrations of starch and alternan a synergistic effect can be observed. At 0% starch an increase in viscosity is observed when the alternan concentration increases from 2% to 6.25% (approx. 10000 cP). At a starch concentration of 2.83% there is a 4-fold to 5-fold increase in viscosity (approx. 45000 cP) when the alternan concentration is increased from 2% to 6.25%. These results are shown in FIG. 1.

Cooking has an effect on viscosity and there is interaction between cooking and the alternan concentration. When the alternan concentration is 2%, cooking does not increase the viscosity significantly. When, however, the alternan concentration is 6.25%, the difference in viscosity between cooking and noncooking comes to about 20000 cP. These results are presented in FIG. 2.

3. Thickening of Pudding

Three different concentrations of alternan (0, 2.5 and 5.0%) and three different starch concentrations (0, 2.25 and 4.5%) were tested in instant pudding and synergies between alternan and starch were evaluated.

Alternan was prepared according to Example 1. The starch in experiments A-F was Firm Tex®, a modified starch derived from waxy maize from National Starch company, and in experiments G, H and I with 4.5% concentration it was Ultrasperse 2000®, a modified starch derived from waxy maize from National Starch.

The results are presented in the following table. Alternan and starch have a thickening effect. A synergistic interaction between starch and alternan was found, and it was especially apparent at a higher starch concentration.

| | A | B | C | D | E |
|---|---|---|---|---|---|
| Starch concentration | — | — | — | 2.25% | 2.25% |
| Alternan concentration | — | 2.5% | 5.0% | — | 2.5% |
| Initial observation | foamy, moderately thick, uniform | foamy, thick, uniform foam layer | foamy, two layers | foamy, uniform | foamy, uniform |
| Initial viscosity, cP (temp. ~11° C.) | 40 | 52 | 70 | 420 | 675 |
| Initial gel strength (force, g) | 0.00 | 0.00 | 0.00 | 0.00 | 0.00 |
| 4 hours observation | similar to initially, dark layer at the bottom | similar to initially, dark layer at the bottom | similar to initially, dark layer at the bottom | similar to initially | foamy, marbled, uniform |
| 4 hours viscosity, cP (temp. ~6.7° C.) | 48 | 58 | 80 | 850 | 2.480 |
| 4 hours gel strength (force, g) | 0.00 | 0.00 | 0.00 | 0.00 | 0.00 |

-continued

|  | | | | | |
|---|---|---|---|---|---|
| 1 day observation | thin, liquid, separated with dark layer at the bottom, foamy at the top | thin, liquid, separated with dark layer at the bottom, foamy at the top | thin, liquid, separated with dark layer at the bottom, foamy at the top | marbled, separated thin layer at the bottom | marbled, separated thin layer at the bottom, dark at the top |
| 1 day viscosity, cP (temp. 2.2° C.) | 48 | 65 | 98 | 2.460 | 3.512 |
| 1 day gel strength | 0.00 | 0.00 | 0.00 | 0.00 | 0.00 |

|  |  | F | G | H | I |
|---|---|---|---|---|---|
|  | Starch concentration | 2.25% | 4.5% | 4.5% | 4.5% |
|  | Alternan concentration | 5.0% | — | 2.5% | 5.0% |
|  | Initial observation | light foam | interspersed with air, uniform | interspersed with air, uniform | large air inclusions, uniform |
|  | Initial viscosity, cP (temp. ~11° C.) | 1.160 | 19.200 | 61.000 | 100.000 |
|  | Initial gel strength (force, g) | 0.00 | 0.00 | 0.00 | 0.00 |
|  | 4 hours observation | light foam, marbled, uniform | slightly interspersed with air, uniform | interspersed with air, uniform | large air inclusions, uniform |
|  | 4 hours viscosity, cP (temp. ~6.7° C.) | 5.736 | 80.400 | 180.000 | 261.200 |
|  | 4 hours gel strength (force, g) | 14.32 | 15.27 | 23.14 | 43.36 |
|  | 1 day observation | no separation, but marbled with lighten flecks, no syneresis, shiny, fairly smooth, thin pudding-consistency | uniform, light interspersed with air, no syneresis, shiny, smooth, typical pudding-consistency | light interspersed with air, no syneresis, shiny, fairly smooth when stirred, acceptable pudding-consistency but sticky | large air inclusions, uniform, no syneresis, medium gloss when stirred, very thick and sticky, white flecks visible |
|  | 1 day viscosity, cP (temp. 2.2° C.) | 5.816 | 92.400 | 206.000 | 360.000 |
|  | 1 day gel strength | 16.86 | 17.67 | 29.57 | 53.73 |

3. Synergistic effect with starches, cellulose derivates, alginate and carrageenan 3.1 Material characterisation:

Starches:

Regular corn starch (Sigma)

Waxy corn starch (Sigma)

Rice starch (12-14% Amylose, 0,5 nmol/mg C-6-Phosphate)

Cellulose derivatives:

Walocel CMC 50000PA (Na-carboxymethylcellulose) of DOW chemical company

Methocel K4M (hydroxypropyl methyl cellulose) of DOW chemical company

Methocel A4M (methylcellulose) of DOW chemical company

Alginate: Na-Alginate (Sigma)

Carrageenan: Iota-Carrageenan (Sigma)

3.2 Methods:

Rapid visco Analyser (RVA):

Alternan in combination with a second thickener was tested in a watery solution (25 g total weight) in Rapid Visco Analyser (Newport Scientific Pty Ltd., Investment Support Group, Warriewod NSW 2102, Australien). The test profile consists of the following:

|  | Temperature (° C.) | Time (min:sec) 25.0 (Idle temperature) | speed (rpm) |
|---|---|---|---|
| 1 | 25.0 | 0:20 | 1000 (initial speed) |
| 2 | 25.0 Ramp up | 5:20 | 160 |
| 3 | 95.0 Hold Cool down | 10:20 13:20 | 160 160 |
| 4 | 25 Hold | 18:20 22:20 | 160 160 |

End of test 23:00

The measured viscosities were as follows:

Initial cold viscosity: viscosity at 5:20 min hot viscosity: viscosity peak at 95° C.

end viscosity: viscosity at end

Texture Analyser (TA):

The gel strength of RVA-samples was measured after storage at room temperature (23° C.) for about 20 hours using a TA XT2 texture analyzer. The settings on the texture analyzer were as follows:

Measurement principle: force in direction of pressure

Forward speed: 2 mm/s

Test speed: 0.5 mm/s

Trigger value: 2.0 g

Reverse speed: 0.5 mm/s

Distance: 7 mm

The positive peak (F1) and the negative peak (F2) in grams were determined.

Viscosity of Alternan in combination with a starch:

| Material | Alternan % | starch % | initial cold viscosity cP | hot viscosity cP | end viscosity cP |
| --- | --- | --- | --- | --- | --- |
| Rice starch | 0 | 5 | 0 | 412 | 1075 |
|  | 10 | 5 | 13 | 2558 | 3496 |
| Regular corn starch (sigma) | 0 | 5 | 0 | 287 | 335 |
|  | 5 | 5 | −3 | 463 | 1276 |
|  | 10 | 5 | 118 | 2149 | 4503 |
| Waxy corn starch (sigma) | 0 | 5 | −4 | 687 | 1017 |
|  | 5 | 5 | 10 | 1492 | 1519 |
|  | 10 | 5 | 197 | 3123 | 4362 |

Viscosity of Alternan in combination with other thickeners:

| Material | Alternan % | gum % | initial cold viscosity cP | hot viscosity cP | end viscosity cP |
| --- | --- | --- | --- | --- | --- |
| Walocel CMC 50000PA | 0 | 1.5 | 653 | 404 | 1083 |
|  | 3 | 1.5 | 1005 | 589 | 1319 |
| Methocel K4M | 0 | 1.5 | 65 | 0 | 247 |
|  | 3 | 1.5 | 231 | 0 | 824 |
| Methocel A4M | 0 | 1.5 | 57 | 0 | 197 |
|  | 3 | 1.5 | 405 | 0 | 747 |
| Na-Alginate | 0 | 1.5 | 15 | 0 | 16 |
|  | 3 | 1.5 | 46 | 2 | 37 |
| Iota-Carrageenan | 0 | 1.5 | 431 | 0 | 844 |
|  | 3 | 1.5 | 625 | 0 | 1241 |

The invention claimed is:

1. A thickening agent composition comprising alternan and at least one other thickening agent, wherein said alternan is obtained with the aid of a bacterial enzyme, and wherein said alternan has a weight-average molecular weight in the range from about 10,000,000 g/mol to about 60,000,000 g/mol.

2. The thickening agent composition of claim 1, wherein the other thickening agent is a polysaccharide other than alternan.

3. The thickening agent composition of claim 1, wherein the other thickening agent is starch, starch derivatives, modified starches, starch phosphates, pectins, modified pectins, alginic acid, alginates, guar flour, tragacanth, gum arabic, gelatin, carob-seed flour, galactomannan, xanthan, carrageen, karaya gum, tara gum, tamarind gum, gellan gum, mannan, maltodextrins, cellulose, derivatized cellulose, dextran or mixtures of two or more of these substances.

4. The thickening agent composition of claim 1, wherein the other thickening agent is starch, modified starches, starch derivatives, starch phosphates, alginates, carrageen, derivatized cellulose or mixtures of two or more of these substances.

5. The thickening agent composition of claim 1, wherein the alternan and the other thickening agent are in a weight ratio from 10:1 to 1:10.

6. The thickening agent composition of claim 1, in the form of a powder.

7. A method of thickening foodstuffs, foodstuff starting products or foodstuff intermediates comprising adding the thickening agent composition of claim 1.

8. The method of claim 7, wherein the foodstuff is sauces, meat juices, soups, dressings, dips, milk products, bakery products or doughs.

9. The method of claim 8, wherein the milk product is yoghurt, cream, full-fat milk, skimmed milk, buttermilk, sour milk, kefir, whey, mousse, jelly, pudding, spreads, jam, or ice cream.

10. The method of claim 9, wherein the yoghurt is drinking yoghurt.

11. A foodstuff, foodstuff starting product or foodstuff intermediate, comprising the thickening agent composition of claim 1.

12. The foodstuff, foodstuff starting product or foodstuff intermediate of claim 11, wherein the foodstuff, foodstuff starting product or foodstuff intermediate is sauces, meat juices, soups, dressings, dips, milk products, bakery products or doughs.

13. The foodstuff of claim 12, wherein the milk product is yoghurt, cream, full-fat milk, skimmed milk, buttermilk, sour milk, kefir, whey, mousse, jelly, pudding, spreads, jam, or ice cream.

14. The method of claim 13, wherein the yoghurt is drinking yoghurt.

15. A method of increasing the viscosity of foodstuffs, foodstuff starting products or foodstuff intermediates, comprising adding the thickening agent composition of claim 1 to the foodstuff, foodstuff starting product or foodstuff intermediate.

16. The method of claim 15, further comprising submitting the foodstuff, foodstuff starting product or foodstuff intermediate to a heat treatment.

17. The thickening agent composition of claim 1, wherein the bacterial enzyme is alternan sucrase from Leuconostoc mesenteroides.

18. A kit comprising alternan and at least one other thickening agent, wherein said alternan is obtained with the aid of a bacterial enzyme, and wherein said alternan has a weight-average molecular weight in the range from about 10,000,000 g/mol to about 60,000,000 g/mol.

19. The kit of claim 18, wherein the other thickening agent is starch, starch derivatives, modified starches, starch phosphates, pectins, modified pectins, alginic acid, alginates, guar flour, tragacanth, gum arabic, gelatin, carob-seed flour, galactomannan, xanthan, carrageen, karaya gum, tara gum, tamarind gum, gellan gum, mannan, maltodextrins, cellulose, derivatized cellulose, dextran or mixtures of two or more of these substances.

20. The kit of claim 18, wherein the other thickening agent is starch, modified starches, starch derivatives, starch phosphates, alginates, carrageen, derivatized cellulose or mixtures of two or more of these substances.

21. The kit of claim 18, wherein the alternan and the other thickening agent are in a weight ratio from 10:1 to 1:10.

* * * * *

UNITED STATES PATENT AND TRADEMARK OFFICE
CERTIFICATE OF CORRECTION

PATENT NO. : 8,541,041 B2
APPLICATION NO. : 12/921022
DATED : September 24, 2013
INVENTOR(S) : Jens Pilling It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 72 days.

Signed and Sealed this
Fifteenth Day of September, 2015

Michelle K. Lee
*Director of the United States Patent and Trademark Office*